United States Patent [19]

Borchard

[11] Patent Number: 5,183,124
[45] Date of Patent: Feb. 2, 1993

[54] COMPACT SELF-ADJUSTING WEIGHING SYSTEM HAVING STABLE MEASUREMENT RESOLUTION

[76] Inventor: John Borchard, 97A Lowell Ave., Newton, Mass. 02160

[21] Appl. No.: 578,461

[22] Filed: Sep. 7, 1990

[51] Int. Cl.$^5$ ............................................. G01G 3/14
[52] U.S. Cl. ............................................. 177/210 FP
[58] Field of Search .................................. 177/210 FP

[56] References Cited

U.S. PATENT DOCUMENTS

| | | | |
|---|---|---|---|
| 3,922,670 | 11/1975 | Shaw et al. | 324/186 X |
| 3,966,002 | 6/1976 | Schneider . | |
| 4,051,721 | 10/1977 | Williams . | |
| 4,191,268 | 3/1980 | Miyoshi et al. . | |
| 4,237,989 | 12/1980 | Lewis . | |
| 4,273,204 | 6/1981 | Gillen . | |
| 4,366,875 | 1/1983 | Dauge et al. | 177/210 FP |
| 4,405,024 | 9/1983 | Fraval et al. | 177/210 FP X |
| 4,405,025 | 8/1983 | Yanagita et al. . | |
| 4,464,725 | 8/1984 | Briefer . | |
| 4,503,922 | 8/1984 | Brosh . | |
| 4,738,324 | 4/1988 | Borchard . | |
| 4,814,692 | 3/1989 | Baumann . | |
| 4,828,057 | 5/1989 | Borchard . | |
| 4,858,145 | 8/1989 | Inoue et al. . | |
| 4,858,145 | 8/1989 | Inoue et al. . | |
| 4,862,978 | 9/1989 | Borchard . | |
| 4,862,979 | 9/1989 | Borchard . | |
| 4,869,331 | 9/1989 | Borchard . | |
| 4,874,051 | 10/1989 | Borchard . | |
| 4,960,177 | 10/1990 | Holm-Kennedy et al. | 177/210 C |

*Primary Examiner*—George H. Miller, Jr.
*Attorney, Agent, or Firm*—Hale and Dorr

[57] ABSTRACT

A weighing system and method having stable measurement resolution for measuring gems and other light masses. The system includes circuitry for correcting errors in the measured value of the masses due to off-center placement on the system's holding pan. The weighing system uses a plurality of transducers about the pan to measure the weight of the mass, and includes circuitry for converting the transducer signals to signals having unknown frequencies. Circuitry is also provided for determining the unknown frequencies with an approximate stable or fixed resolution, despite wide variations in the unknown frequency. In a preferred embodiment, the number of cycles on the unknown frequency is counted and counting begins and ends of the rising edges of the unknown frequency signal. The determination of which unknown frequency edge ends the counting operation is made by monitoring a known frequency counter. When a predetermined minimum number of known frequency cycles have been accumulated, the next rising edge of the unknown frequency signal terminates the counting operation. The unknown frequency is then calculated. Finally, the frequencies from each sensor are correlated for a given mass, at given locations, to arrive at an accurate weight value for the mass in spite of its potentially off-center location on the system's weighting pan.

26 Claims, 5 Drawing Sheets

COMPACT SELF-ADJUSTING WEIGHING SYSTEM HAVING STABLE MEASUREMENT RESOLUTION

BACKGROUND OF THE INVENTION

1. Field of the Invention

The present invention relates generally to the field of measuring apparatus for light masses. More particularly, the present invention relates to an electronic balance having a predetermined measurement resolution.

2. Discussion of the Prior Art

There are many ways to measure weight. One problem that all weighing apparatus face is that of off center pan loading in which the mass to be weighed is not located at the exact center of the weighing pan, but is off to one side. U.S. Pat. No. 4,738,324, the specification of which is hereby incorporated by reference, discloses an improved way of handling the problem of off-center pan loading. The technique of that system is a self-adjusting one in which the effects of off-center loading in the load cell are measured and corrected before the weight reading is outputted. The device constructed in accordance with that technique measures deflections at a plurality of locations on a spring-supported pan, and combines the separate measurements to yield the weight on the pan, corrected for load placement location, i.e., off-center loading.

The circuitry of the weighing system of the '324 patent makes use of a period counter circuit, for determining the frequency of each capacitor sensor, which counts a fixed clock frequency (also referred to as the known frequency) for a number of cycles of the chosen frequency (also referred to as the unknown frequency) generated by a respective capacitor sensor. The system counts known frequency (KF) cycles occurring in a predetermined number of unknown frequency (UF) cycles. This measures the period of the unknown frequency, which is the frequency generated by one of the capacitor sensors. The fixed or known frequency of the '324 system is a one megahertz signal. Therefore, counting the cycles occuring within a one megahertz KF signal between the two rising edges in the UF signal directly yields the UF in microseconds. However, if the UF signal frequency generated by one of the capacitor sensors is too high, the resolution of the frequency measurement using a period counter decreases. For example, if the unknown frequency was 10 Hertz, this would produce 100,000 counts of a 1 megahertz KF crystal within one unknown frequency cycle, resulting in a measurement resolution of one part in 100,000. But if the UF were instead 100 kilohertz, the period of the UF would only be 10 microseconds, thus producing 10 counts of a 1 megahertz KF crystal within one UF cycle. This results in a measurement resolution of only one part in ten. Thus, the uncontrollable resolution of the period measurement may introduce inaccuracies into the final weight determination.

On the other hand, if the '324 system used a frequency measurement circuit, the problem of uncontrollable resolution would still exist. In a direct frequency measurement circuit, the number of cycles in the UF signal is counted for a fixed time. The fixed time period is typically determined by counting a predetermined number of cycles of a known time base frequency, such as a crystal. This method works well for unknown frequencies which have a high frequency. However, as the frequency of the UF decreases, the resolution of the frequency measurement technique decreases as well. For example, if the UF is 10 Hertz it will exhibit $10 +/- 1$ rising edges in any one second period, resulting in a measurement resolution of only one part in 10.

The following table summarizes these measurement resolutions:

| Measurement Resolution (Known frequency (KF) = 1,000,000 Hz) | | |
|---|---|---|
| Unknown Frequency (UF) | Frequency Measurement Technique | Period Measurement Technique |
| 10 Hz | 1/10 (poor) | 1/100,000 (good) |
| 100,000 Hz | 1/100,000 (good) | 1/10 (poor) |

As can be seen, neither a period measurement technique nor a frequency measurement technique provides stable measurement resolution for all ranges of unknown frequencies.

Other aspects of prior art weighing systems may be seen in U.S. Pat. Nos. 4,828,057; 4,862,978; 4,869,331; 4,862,979; and 4,874,051, the specifications of which are hereby incorporated by reference.

Therefore, an object of the present invention is to provide an improved version of the '324 weighing system which has stable measurement resolution.

Another object of the present invention is to provide a weighing system using a more accurate method of processing sensed signals to calculate the weight of an object than prior art systems.

SUMMARY OF THE INVENTION

The foregoing and other objects, features, and advantages of the present invention ar achieved in a compact self-adjusting weighing system that accurately compensates for off center pan loading. The pan and sensor assembly includes a plurality of capacitors formed between two rigid, closely-spaced plates with patterns of conductive material on the plates forming the capacitors.

The measurements generated by the pan and sensor assembly are electronically gathered as measured values $f_c$, for each capacitor. Each capacitance value is converted into an unknown frequency value. The unknown frequency value generated for each capacitor is then counted, using dedicated circuitry or a combination of circuitry and microcomputer software which provides a stable measurement resolution despite changes in the unknown frequency.

In a preferred embodiment, the number of cycles of both the unknown frequency and of a known frequency are counted, beginning and ending on the rising edges of the unknown frequency signal. The determination of which unknown frequency edge ends the counting operation is made by monitoring a known frequency counter. When a predetermined minimum number of known frequency cycles have been accumulated, the next rising edge of the unknown frequency signal terminates the counting operation. The unknown frequency is then calculated. The frequencies from each sensor are correlated for a given mass, at given locations, to arrive at an accurate weight value for the mass in spite of its potentially off center location on the system's weighing pan.

The foregoing and other objects, features, and advantages of the present invention will be more readily understood and apparent from the following detailed description of the invention, which should be read in conjunction with the accompanying drawings, and from the claims which are appended at the end of the detailed description.

DETAILED DESCRIPTION

Figure 1:
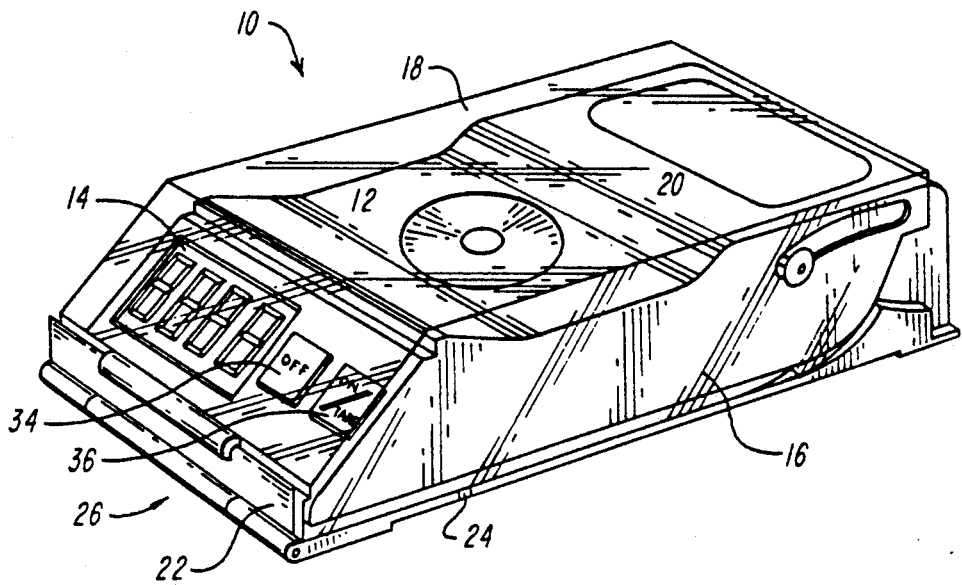
FIG. 1 is a perspective view of a weighing system constructed in accordance with the present invention.
Figure 2:
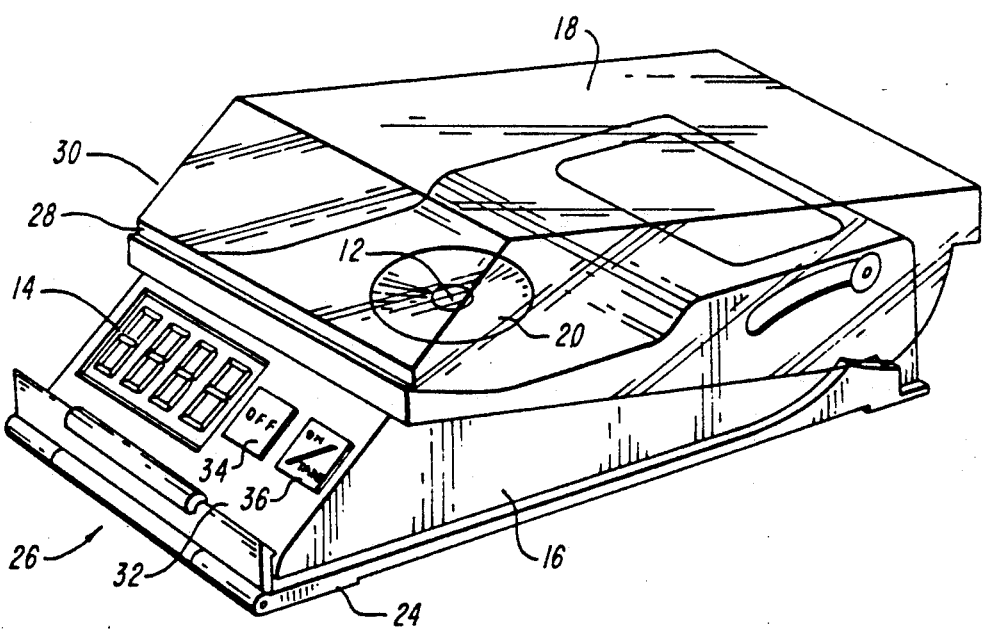
FIG. 2 shows the invention of FIG. 1 in use.

Referring now to the drawings in detail, wherein like numerals refer to like elements, reference numeral 10 refers generally to a preferred embodiment of the present invention. This embodiment of the invention is a self-contained scale for accurately measuring the weighing of gems or other very light masses 12. The scale 10 provides a digital reading on an LCD display 14 of the weight of the item 1 being weighed. The scale 10 is enclosed within a casing 16 and has over its top, front, and sides a transparent dust cover 18 which may be completely opened, exposing a weighing platform or pan 20 upon which the mass 12 to be weighed is placed. The dust cover 18 is held in the fully closed position by means of a spring latch 22 pivotally attached to the casing bottom 24 at the casing front 26. The latch 22 hooks onto a horizontal notch 28 in the front portion 30 of cover 18. The casing front 26 also contains a keyboard 32 with two keys 34 and 36. The OFF key 34 shuts the scale 10 off. The ON/TARE key 36 turns the system power on and performs a TARE function which is a zeroing function compensating for possible drift in null weight, pan weight, dust, etc.

Figure 3:
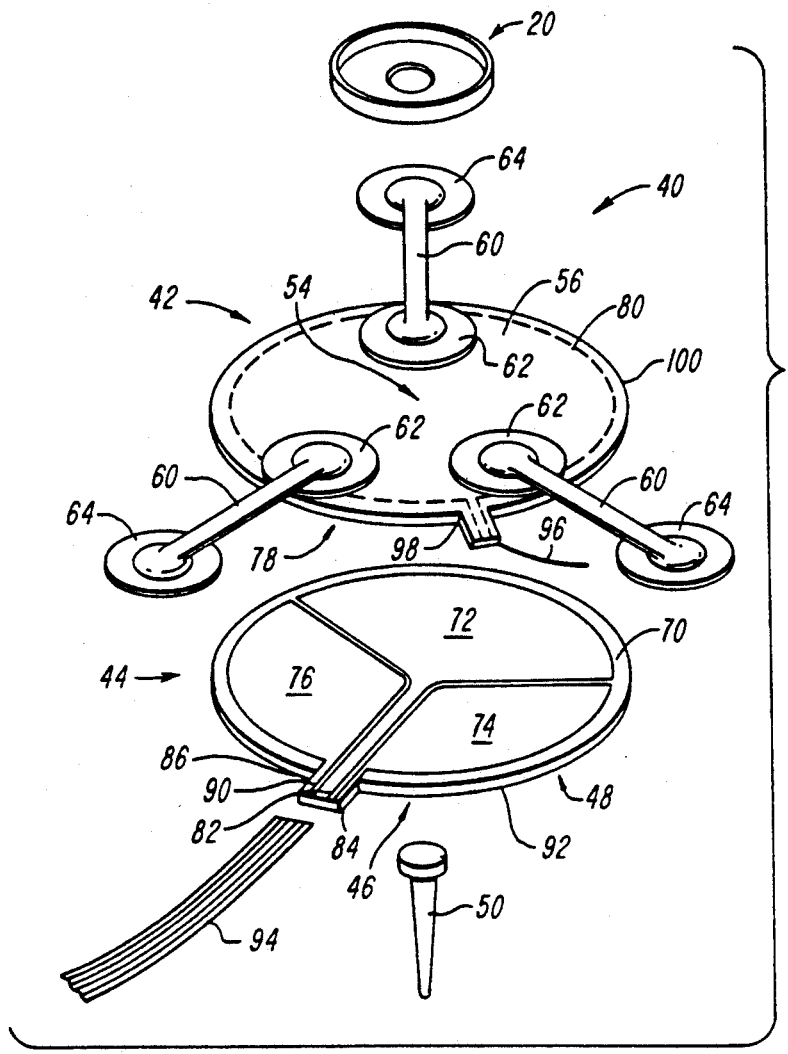
FIG. 3 is a perspective exploded view of an unassembled pan and sensor assembly used in the weighing system of FIG. 1.
Figure 4:
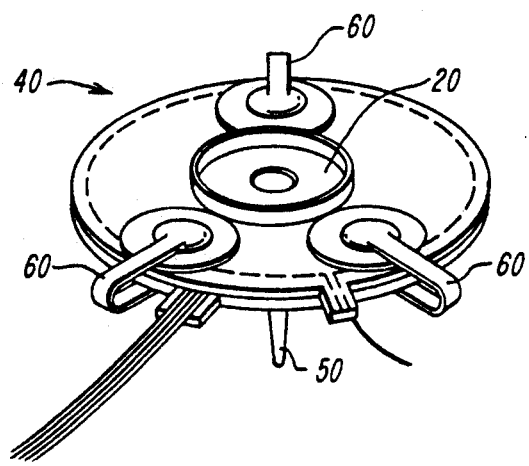
FIG 4 is a perspective view of the assembled pan and sensor assembly of FIG. 3.
Figure 5:
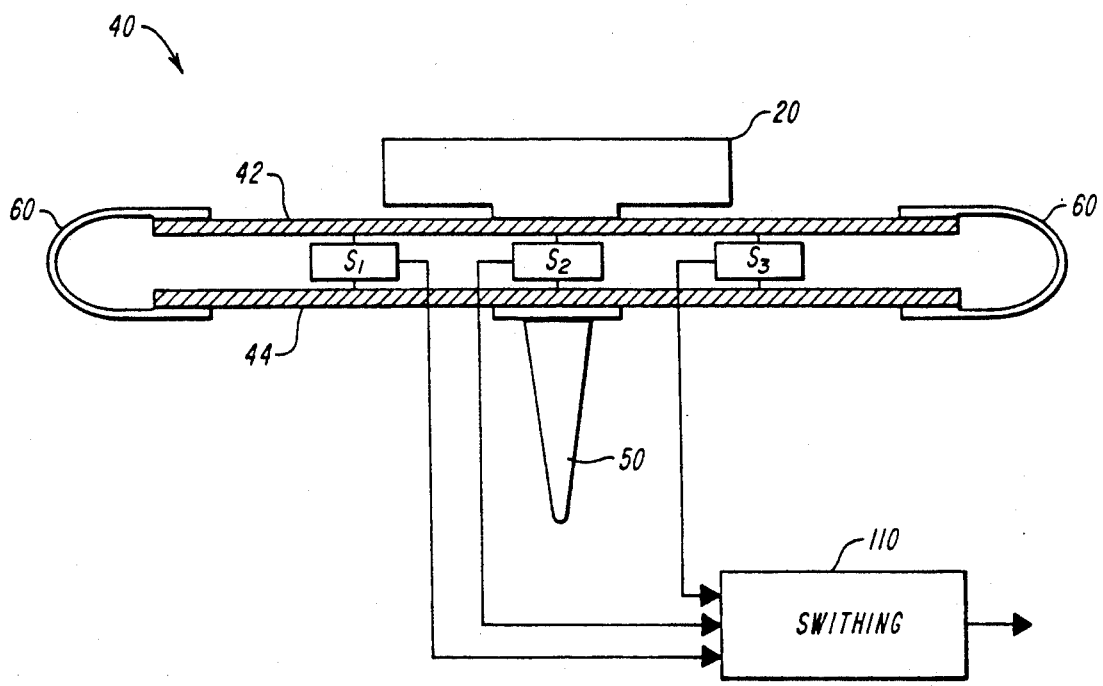
FIG. 5 shows, in schematic block diagram form, an exemplary embodiment of the pan and sensor assembly used in the weighing system of FIG. 1.

Reference is now made generally to FIG. 5, and specifically to FIGS. 3-4, which show the pan and sensor assembly 40 in detail. The pan and sensor assembly 40 includes two flat, rigid, nonconductive plates, 42 and 44 disposed facing each other about a central axis. Extending vertically downward from the center 46 of the bottom face 48 of the bottom plate 44 is a rigid member or pin 50. One end of rigid member 50 is fixedly attached to the cente 46 of plate 44 and its other end is fixedly attached to a printed circuit board containing the invention's electronics located on the casing bottom 24 or to the casing bottom 24 itself as described in the '324 patent. Either may act as a base for the pan and sensor assembly 40. A weighing pan 20 is mounted to the center 54 of side 56 of plate 42. Plates 42 and 44 are separated by force generated by leaf springs 60. An end 62 of each leaf spring is fixedly attached to side 56 of plate 42, using an adhesive or other equivalent means. Another end 64 of springs 60 is attached to the surface 48 of bottom plate 44 using an adhesive or the like. Any off-center placement of the mass 12 to be weighed in the weighing pan 20 is translated into a downward force and also into a predictable plate tipping movement, thereby allowing the invention's computer to compensate for any tendency of the pan 20 to tip due to off-center placement of the mass 12 to be weighed. Since bottom plate 44 and pin 50 are fixedly attached to either the printed circuit board or the casing bottom, the bottom plate 44 provides a flat, rigid point of reference for the tipping movement of the pan 20 and the upper plate 42.

The bottom plate 44 is made of nonconductive material but has a specific pattern of conductive material silkscreened onto its nonglued facing side 70, consisting of three, separate, symmetrical, roughly pie shaped regions 72, 74, and 76. The centers of conductive regions 72, 74, and 76 are spaced approximately 120° from each other on the surface 70. The top plate 42 is also made of a nonconductive material. Its nonglued facing side 78 has a solid, 360° conductive region 80 silkscreened on. In effect, the two plates 42 and 44 form three capacitor-sensors $S_1$, $S_2$, and $S_3$. Sensor $S_1$ is formed by conductive region 80 and conductive region 72. Sensor $S_2$ is formed by conductive region 80 and conductive region 74. Sensor $S_3$ is formed by conductive region 80 and conductive region 76. The respective electrical connections 82, 84, and 86 for conductive regions 72, 74, and 76 on lower plate 44 ar brought out to one portion 90 on the lower capacitor plate's periphery 92. Cable 94 is connected to conductors 82, 84, and 86 at portion 90. The electrical connection for upper plate 42 is made to conductor 96 at portion 98 disposed along the outer periphery 100 of plate 42.

As noted, plates 42 and 44 are separated from each other by force exerted by springs 60. Springs 60 translate the weight of the object 12 being measured into a displacement between the plates 42 and 44. The three capacitors formed by the regions 80, 72 and 80, 74 and 80, 76 are roughly 22 to 30 picofarads each, and are employed as sensors in which the weight applied against the sensor effects a change in capacitance which is converted by electronics to a freguency inversely proportional to the capacitance. Thus, electrical outputs are obtainable which are analogs of the weight of the object 12 being measured, the variation in values of each of the three capacitors 80, 72 and 80, 74 and 80, 76 reflects tipping from the position of the object 12 being measured on the pan 20 as well as its weight. In the present invention, perfect centering of the object 12 to be measured on the top pan 20 would mean nominally that the capacitance values for each of the capacitors 80, 72 and 80, 74 and 80, 76 would be the same. However, the slightest deviation from perfect nominal centering means that the capacitance values for each capacitor will be different.

Figure 6:
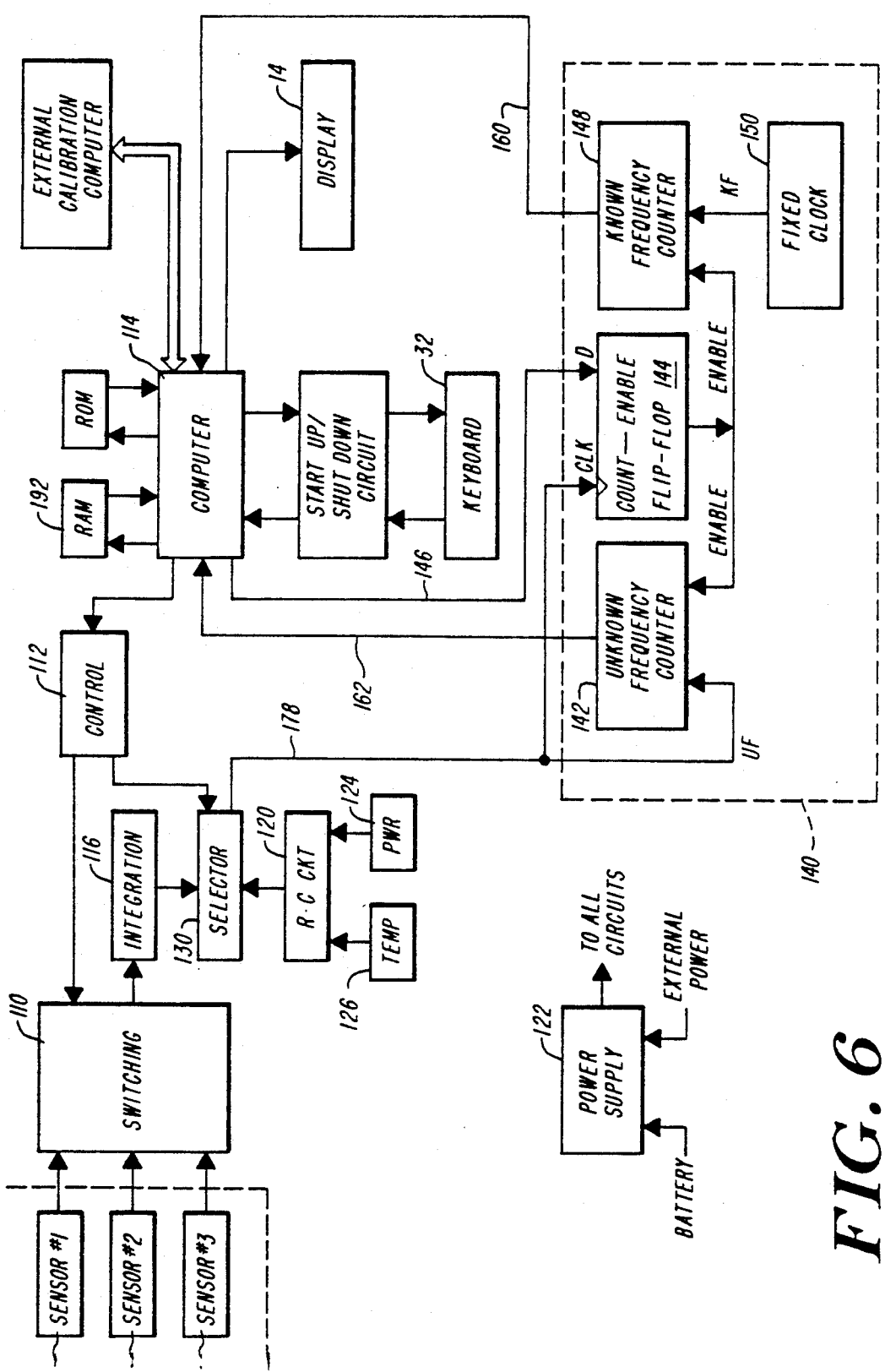
FIG. 6 shows, in block diagram form, the processor electronics used in the weighing system of FIG. 1.

Referring now to FIGS. 5 and 6, the reference characters $S_1$, $S_2$, and $S_3$ designate capacitance sensor values from the three capacitors formed by the elements 80, 72 and 80, 74 and 80, 76. The values are analogs of the weight of the object 12 being weighed and reflect the position of the object 12 on the pan 20. The sensors $S_1$, $S_2$, and $S_3$ are each selected sequentially, by analog switching 110 under control 112 from a computer 114, and used in an integration-type circuit 116 to create a frequency $f_c$ in the 1 kilohertz range, where $f_c = f_1$ or $f_2$ or $f_3$ depending on which capacitor-sensor $S_1$, $S_2$ or $S_3$ is selected. Each capacitor-sensor $S_1$, $S_2$, and $S_3$ is sampled and averaged for 100 milliseconds at a time in one embodiment of the invention. An R-C circuit 120 using a fixed 0.01 microfarad capacitor may also be used to measure the power supply 122 voltage across a fixed resistor 124 or to measure temperature sensitivity across a temperature sensitive resistor 126. This information, in the form of a frequency $f_v$ for voltage or $f_T$ for temperature, is used by the invention's computers 114 to compensate for variations in temperature and voltage.

These several frequencies are chosen by a selector circuit 130 under computer control 112. The chosen frequency is sent to circuitry 140, which circuitry in conjunction with computer 114, may be termed similar period frequency measurement circuitry. As will be explained in greater detail hereinafter, similar period frequency circuitry 140 functions to count both the unknown frequency and a known frequency, but for a time interval which is not predetermined. In one embodiment, counting begins and ends on the rising edges of the UF signal, but the determination of which UF edge ends the counting is made by monitoring the KF count. When a predetermined minimum number of KF cycles have been accumulated, the next rising edge of the UF signal terminates counting of both the UF and the KF. In particular, the chosen unknown frequency from selector 130 is supplied to unknown frequency counter 142 and count enable flip-flop 144 over connection 178. The chosen unknown frequency acts as the clocking signal for counter 142 and flip flop 144.

Upon receipt of a count enable signal, which may be a computer flag, for example, from computer 114 over connection 146, the next rising edge of the chosen frequency causes count enable flip flop 144 to generate an enable signal which is sent to unknown frequency counter 142 and known frequency counter 148. At this point, the known frequency counter 148 begins counting cycles of the fixed clock 150. The frequency of fixed clock 150 is in the 1 megahertz range in a preferred embodiment. At the same time, unknown frequency counter 142 begins to count the cycles of the chosen unknown frequency sent from selector circuit 130. The KF counter 148 sends the number of counts to computer 114 over connection 160. The UF counter 142 sends the number of counts to computer 114 over connection 162. Computer 114 is programmed to receive a predetermined minimum number of KF counts. When the predetermined number of known frequency counts have been received, computer 114 removes the count enable signal to count enable flip-flop 144. Thereafter, on the next rising edge of the chosen unknown frequency, the enable signal generated by count enable flip-flop 142 is removed thus terminating the counting processes in both the UF counter 142 and the KF counter 148.

Thereafter, computer 114 performs a calculation to determine the frequency counted by the unknown frequency counter 142 according to the equation $$\text{Frequency} = \frac{\text{(Number of Unknown Frequency Cycles)}}{\text{(Number of Known Frequency Cycles)}} \times \text{(Actual Frequency of the Known Frequency)} \quad (1)$$

Similar period frequency measurement circuitry 140 provides several important advantages. First and foremost, this method and circuit for determining the chosen unknown frequency maintains a nearly constant, stable, measurement resolution. The known frequency and the unknown frequency are counted, but the time interval over which they are counted is not fixed. The circuitry combines the benefits of direct frequency measurement and direct period measurement. Consequently, and with reference to the earlier discussion of measurement resolutions, with a known frequency of one megahertz, the present invention is able to maintain a measurement resolution of one part in one hundred thousand (1/100,000) despite an unknown frequency which varies from 10 hertz to 100,000 hertz.

Figure 7:
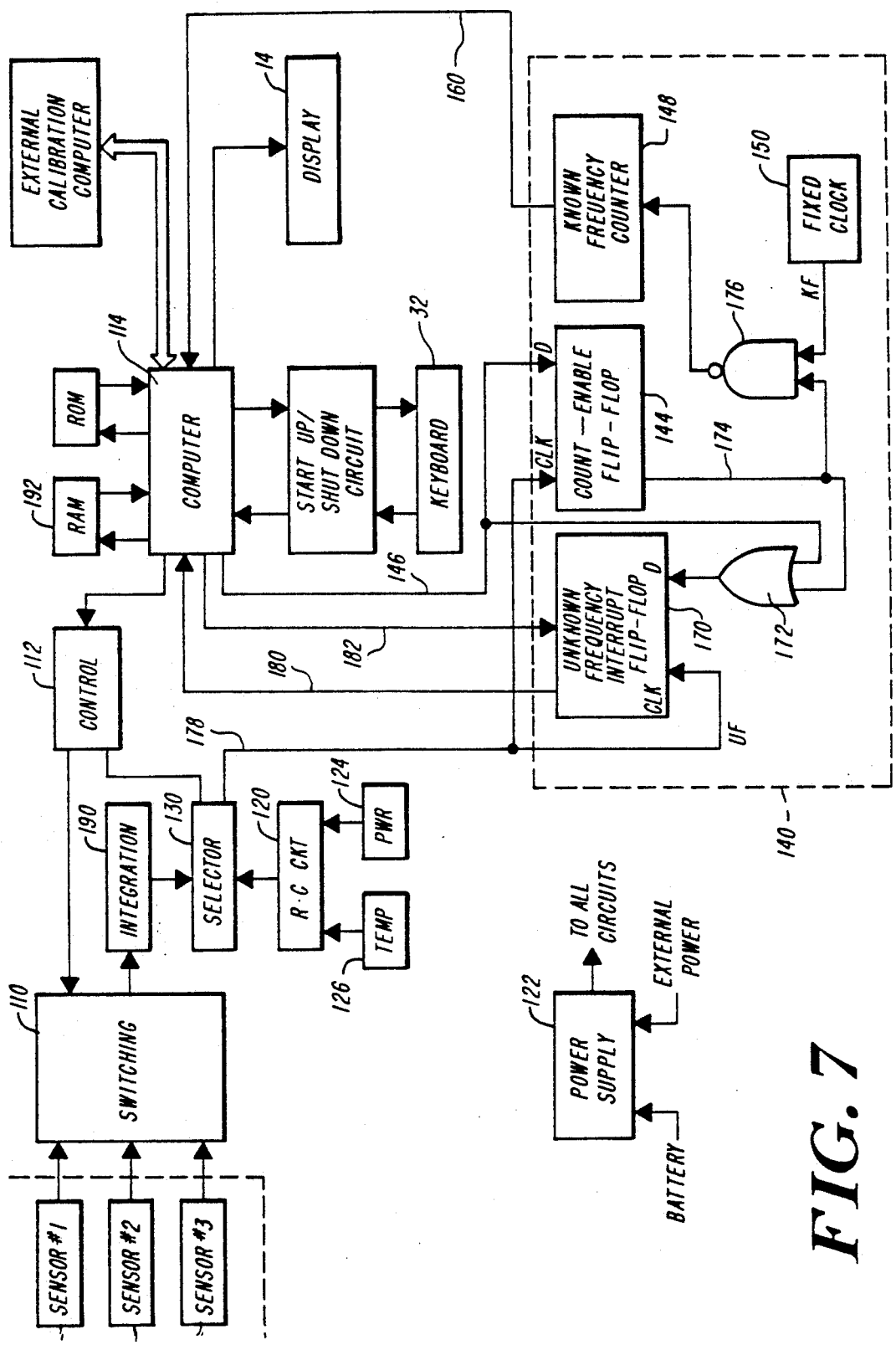
FIG. 7 shows, in block diagram form, an alternate embodiment of the processor electronics used in the weighing system of FIG. 1.

Referring to FIG. 7, there is shown an alternate embodiment of the processor electronics that may be used in the present invention. In FIG. 7, the same components have been given like reference characters. In the circuit of FIG. 6, counting of the unknown frequency is performed in hardware, while the circuit of FIG. 7, counting of the unknown frequency is performed using software and registers contained in computer 114. Thus, in the circuit of FIG. 7, the similar period frequency measurement circuitry 140 includes different components.

Unknown frequency counter 142 is replaced with unknown frequency interrupt flip flop 170. An additional OR gate 172 is provided which couples the count enable signal on line 146 and the count enable flip-flop output signal over connection 174 to the D input of flip flop 170. OR gate 172 assures that no UF cycles are missed at the start and/or end of the counting cycle Also included is NAND gate 176 which couples the enable signal from count enable flip-flop 144 over connection 174 and the fixed clock signal from fixed clock 150 to KF counter 148.

During operation, the unknown frequency is sent to unknown frequency interrupt flip flop 170 and count enable flip flop 144. Upon receipt of a count enable signal from computer 114 over connection 146, the next rising edge of the chosen UF sent over connection 178 causes count enable flip flop 144 to generate an enable signal which is sent to OR gate 172 and NAND gate 176. Thereafter, KF counter 148 begins counting cycles of the fixed clock 150. The frequency of fixed clock 150 is in the 1 megahertz range in a preferred embodiment. The KF counter 148 sends a number of counts to computer 114 over connection 160. At the same time, unknown frequency interrupt flip-flop 170 sends an interrupt to computer 114 over line 180. Software resident in computer in computer 114, through the use of registers and the like, thereafter registers the interrupt generated by flip flop 170. Computer 114 then sends a "clear" signal over connection 182 to the CLR terminal of flip flop 170. On the next and subsequent rising edges of the UF signal, the cycle is repeated.

Computer 114 is programmed to receive a predetermined minimum number of KF counts. When the predetermined number of KF counts from KF counter 148 have been received, computer 114 removes the count enable signal to count enable flip-flop 144. Thereafter, on the next rising edge of the chosen unknown frequency, the enable signal generated by count enable flip-flop 144 over connection 174 is removed, thus terminating the counting processes in both the KF counter 148 and the UF counter in computer 114. Computer 114 then performs a calculation in accordance with equation (1) to determine the UF frequency chosen by selector circuit 130.

One skilled in the art will appreciate that although the operation of circuitry 140 has been explained with respect to specified signal polarities and control signal edges, it is a matter of design choice to specify the qualities of the control signals and any such design variations are still within the scope of the invention.

The circuits illustrated in FIGS. 6 and 7 provide several advantages. First, the added hardware requirements in the circuits are compatible with digital electronics designs, which are commonly built into gate arrays, thus, the added hardware required can be incorporated into the gate array at a very low cost. In addition, frequency measurement can be implemented as a state machine, resulting in intelligent reactions to changes in the unknown frequency. For example, a state machine can be organized to react in a controlled fashion to an unknown frequency with a zero frequency or an unknown frequency that stops during the time the measurement is taken. In addition, the total time of the measurement can be controlled, and a warm up period of any length desired can precede the measurement time to let the signals settle down before a measurement is taken, to allow for warm up shifts, to allow for start up instabilities, etc.

A typical example of a weighing operation is as follows. The cover 18 is fully opened, and a gem or other very light object 12 is then placed onto the pan 20. The cover 18 is set up over the pan 20 in a partially closed position while the weighing process takes place. Each of the springs 60 will most likely compress a different amount due to off center loading. Consequently, the three sensors $S_1$, $S_2$, and $S_3$ will sense different weights and will generate capacitance values corresponding to the different weights sensed. The computer 114 will direct the analog switch 110 to sample each of the sensors $S_1$, $S_2$, and $S_3$ sequentially, for 100 milliseconds each. A sensor is switched into an integration circuit 190 where a frequency $f_c$ corresponding to the value of the sampled sensor is outputted to a selector circuit 130. The frequency $f_c$ of the sensor being sampled is passed to similar period frequency circuitry 140 which, in conjunction with computer 114, counts the fixed clock 150 frequency and a number of cycles of the chosen unknown frequency $f_c$. Thereafter, the computer calculates $f_c$ using equation (1). The result of this calculation is that a number for $f_c$ is stored in computer memory RAM 192. In the illustrated embodiment of the invention 10, three capacitor type sensors $S_1$, $S_2$, and $S_3$ are measured resulting in three values of $f_c$, namely $f_1$, $f_2$, and $f_3$. Thereafter, the weight of the object may be calculated in a manner such as that described in the '324 patent. One skilled in the art will appreciate that the present invention is not limited to having three such sensors, but may have a greater or lessor number of sensors depending upon the application.

Having thus described on particular embodiment of the invention, various alterations, modifications and improvements will readily occur to those skilled in the art. For example, one skilled in the art will appreciate that the similar period frequency measurement circuitry 140 can be embodied in a variety of forms depending upon the polarities of the signals involved. Such alterations, modifications and improvements as are made obvious by this disclosure are intended to be part of this disclosure though not expressly stated herein, and are intended to be within the spirit and scope of the invention. Accordingly, the foregoing description is by way of example only, and is not intended as limiting. The invention is limited only as defined in the following claims and equivalents thereto.

What is claimed is:

1. A self-adjusting weighing system, comprising:
   at least one sensor means for sensing weight;
   first circuit means for converting an output of the at least one sensor means to a signal having an unknown frequency;
   second circuit means for providing a signal having a known frequency; and
   similar period frequency measurement means including means responsive to the first and second circuit means for determining the frequency of the unknown frequency signal by counting a number of full cycles of the unknown frequency during a time frame over which a predetermined number of full cycles of the known frequency is counted.

2. The self-adjusting weighing system of claim 1 wherein the at least one sensor means comprises a plurality of sensor means.

3. The self-adjusting weighing system of claim 1, wherein the means for computing the unknown frequency includes means for computing according to the formula:

$$\text{Frequency} = \frac{\text{(Number of Unknown Full Frequency Cycles)}}{\text{(Number of Known Full Frequency Cycles Defined by Number of Unknown Full Frequency Cycles)}}$$

4. The self-adjusting weighing system of claim 3 further comprising means for multiplying the computed unknown frequency by an actual frequency of the known frequency.

5. The self-adjusting weighing system of claim 3 further comprising a known frequency counter means coupled to and receiving the known frequency signal from the second circuit means, said known frequency counter means including means responsive to a count enable signal for initiating and terminating counting.

6. The self adjusting weighing system of claim 5 further comprising an unknown frequency counter means coupled to and receiving the unknown frequency signal from the first circuit means, said unknown frequency counter means including means responsive to the count enable signal for initiating and terminating counting.

7. The self-adjusting weighing system of claim 6 wherein the similar period frequency measurement means further comprises computing means.

8. The self adjusting weighing system of claim 7 wherein the similar period frequency measurement further means comprises a count enable flip-flop means coupled to the computing means having means responsive to the computing means for generating the count enable signal.

9. The self adjusting weighing system of claim 7 wherein the unknown frequency counter means is implemented as a state machine in the computing means.

10. The self-adjusting weighing system of claim 7 wherein the unknown frequency counter means comprises interrupt driven software resident in the computing means.

11. The self-adjusting weighing system of claim 10 wherein the unknown frequency counter means further comprises an unknown frequency circuit means which provides a signal to the interrupt driven software.

12. The self adjusting weighing system of claim 10 wherein the similar period measurement means is implemented as a state machine in the computing means.

13. The self-adjusting weighing system of claim 1 wherein the sensor means includes capacitors.

14. The self-adjusting weighing system of claim 13 wherein the capacitors are formed between two rigid, closely spaced, nonconductive plates with specific conductive regions on their facing surfaces, one said plate being attached to a pan means and the other said plate being rigidly attached to a base means.

15. The self adjusting weighing system of claim 14 wherein the conductive region on the said plate attached to the base includes three separate regions forming three separate capacitors.

16. The self adjusting weighing system of claim 15 wherein the conductive pattern on the plate attached to the pan includes a single electrically conductive region covering at least a portion of the plate s facing surface.

17. The self-adjusting weighing system of claim 16 wherein the conductive region on the plate attached to the pan is a solid 360-degree region covering the plate's facing surface.

18. Apparatus for measuring a frequency of a signal having an unknown frequency with a substantially fixed measurement resolution, comprising:
   circuit means for generating a known frequency signal;
   means for counting a number of cycles of the known frequency signal;
   means, coupled to the means for counting the known frequency and receiving the unknown frequency, for terminating counting of the unknown frequency and the known frequency on a predetermined edge of the unknown frequency counted immediately after a predetermined number of full cycles of the known frequency signal is counted; and
   means, responsive to the known frequency signal counting means and the unknown frequency for determining the frequency of the unknown frequency signal.

19. The apparatus of claim 18 wherein the means for determining the frequency includes means for computing according to the formula:

$$\text{Frequency} = \frac{\text{(Number of Unknown Full Frequency Cycles)}}{\text{(Number of Known Full Frequency Cycles Defined by Number of Unknown Full Frequency Cycles)}}$$

20. The apparatus of claim 19 further comprising means for multiplying the frequency by an actual frequency of the known frequency.

21. The apparatus of claim 20 wherein the means for initiating and terminating counting terminates counting of the unknown frequency and the known frequency on an edge of the unknown frequency after a predetermined number of cycles of the know frequency have been accumulated.

22. The apparatus of claim 21, further comprising means for counting a number of cycles of the unknown frequency responsive to the means for initiating and terminating counting.

23. In a self-adjusting weighing system having at least one sensor for sensing a weight of an object, a method of determining the weight of the object with a substantially fixed measurement resolution, comprising the steps of:
   converting the sensed weight to at least one signal having an unknown frequency;
   providing a signal having a known frequency;
   counting a number of cycles of the unknown frequency signal and a number of cycles of the known frequency signal;
   terminating counting on a predetermined edge of the unknown frequency signal counted immediately after a predetermined number of full cycles of the known frequency signal is counted; and
   computing the frequency of the unknown frequency signal from the number of counts of the unknown frequency signal and the known frequency signal.

24. The method of claim 23 wherein the step of computing the frequency of the unknown frequency signal further includes computing according to the formula:

$$\text{Frequency} = \frac{\text{(Number of Unknown Full Frequency Cycles)}}{\text{(Number of Known Full Frequency Cycles Defined by Number of Unknown Full Frequency Cycles)}}$$

25. The method of claim 24 further comprising the step of multiplying the computed unknown frequency by an actual frequency of the known frequency.

26. The method of claim 24 further comprising the step of terminating counting of the unknown frequency and the known frequency on an edge of the unknown frequency after a predetermined number of cycles of the known frequency have been accumulated.

* * * * *